April 15, 1969  J. E. LARSEN ET AL  3,438,125
METHOD FOR ATTAINING THE DESIRED CONFIGURATIONS
OF ELECTRICAL COILS
Filed Jan. 13, 1967 Sheet 1 of 2
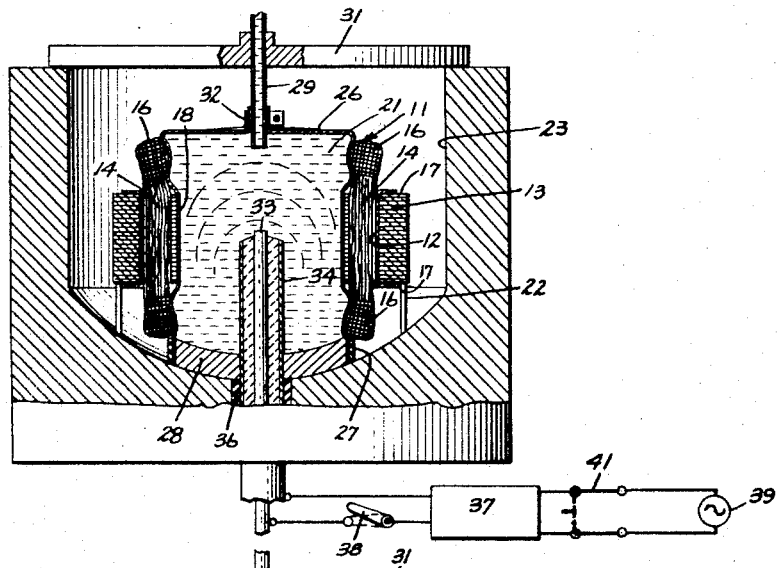
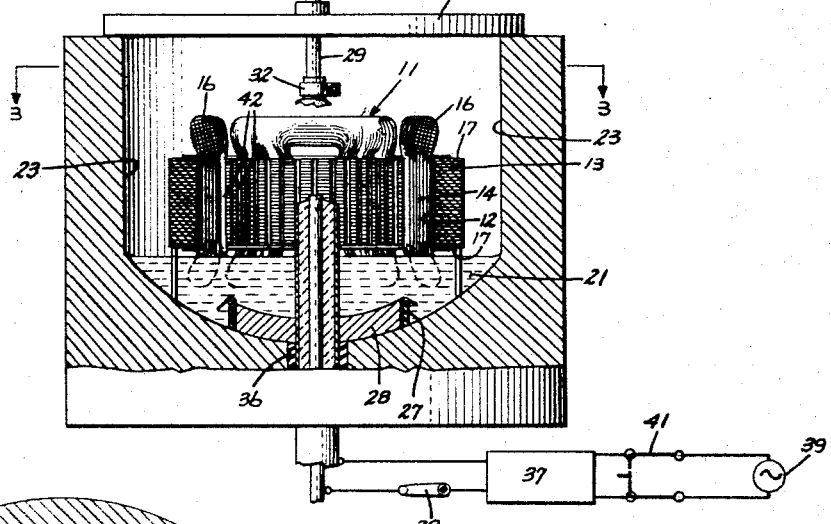
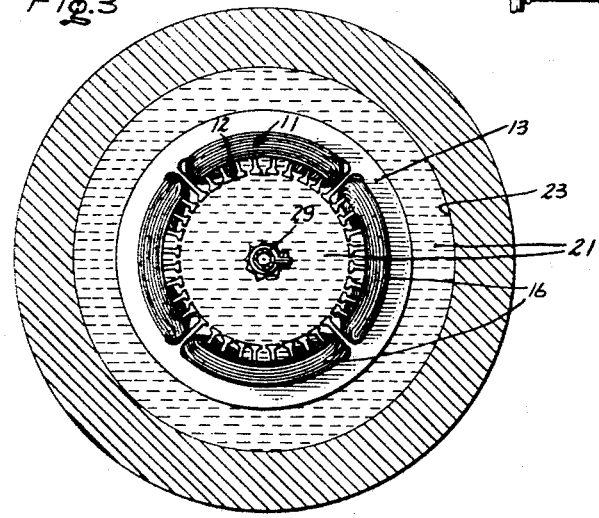
INVENTORS:
John E. Larsen,
Harold R. VanDerzee,
BY John M. Stoudt
Attorney.

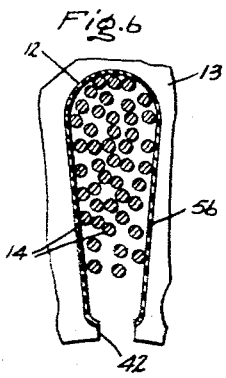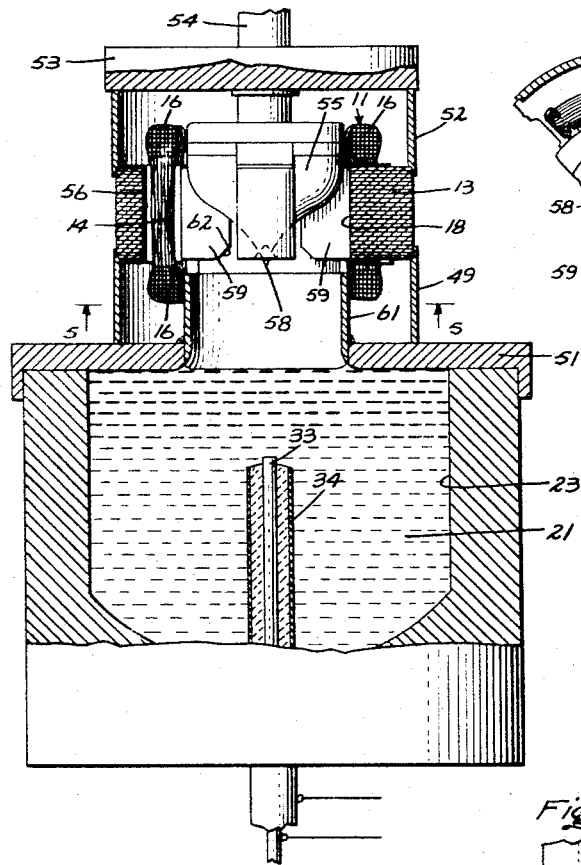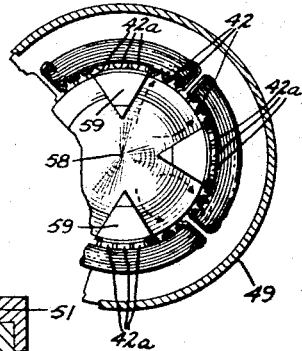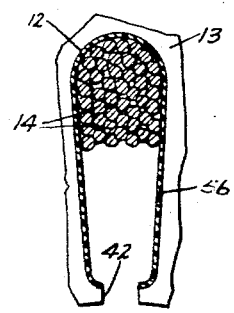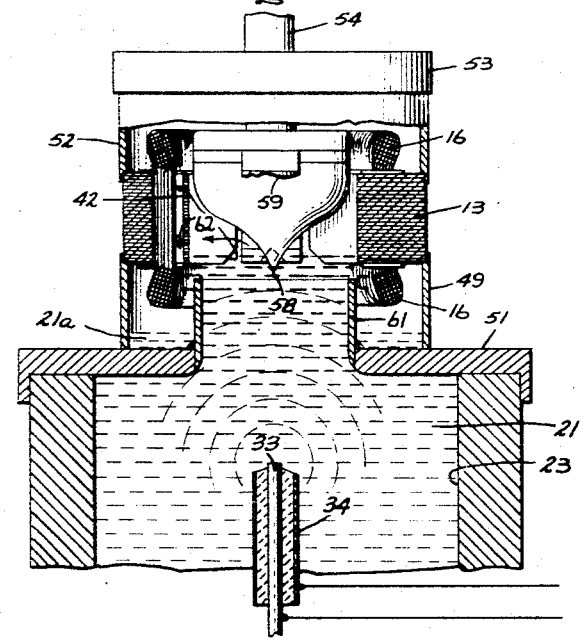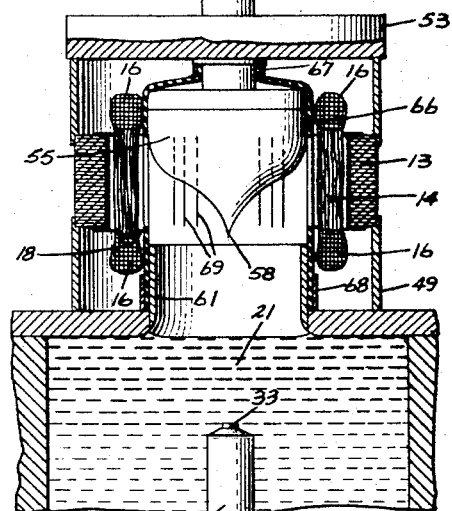
INVENTORS:
John E. Larsen,
Harold R. Van Derzee,
BY
Attorney.

United States Patent Office 3,438,125
Patented Apr. 15, 1969

3,438,125
METHOD FOR ATTAINING THE DESIRED CONFIGURATIONS OF ELECTRICAL COILS
John E. Larsen, Fort Wayne, Ind., and Harold R. Van Derzee, New Baltimore, N.Y., assignors to General Electric Company, a corporation of New York
Filed Jan. 13, 1967, Ser. No. 609,192
Int. Cl. H01f 7/06; B23p 17/00; B21d 26/14
U.S. Cl. 29—606        7 Claims

ABSTRACT OF THE DISCLOSURE

Method for press back of selected portions of electrical conductor means, such as electrical coils, from one configuration to another. An electrical discharge pressure wave is imparted to a pressure transmitting medium retained in the vicinity of the selected portions as they are carried in suitable accommodating structure, for example, slots of a magnetic core for use in an inductive device. The medium is directed into pressure engagement with the preselected portions such that the portions are forced into the desired configuration. By using unhardened adhesive material in solution for the medium, it is possible to concurrently impregnate the coils with the material which can thereafter be hardened to hold the selected portions in the desired configuration.

BACKGROUND OF THE INVENTION

This invention relates to an improved method for attaining the desired configurations of electrical conductors. More specifically, it relates to an improved method for attaining the desired press-back of electrical coils with respect to coil accommodating structure, such as magnetic cores of electrical inductive devices, including dynamoelectric machines incorporating one or more electrical coils.

In the manufacture of such device, it is quite desirable, if not essential, to press back parts of electrical coils relative to the core of the device in order to attain the desired configuration of the coils. By way of illustration, in the production of dynamoelectric machine stators, coil side portions which are received in slots of the stator core as well as the coil end turn portions which project axially beyond the end faces of the core, are forced back into a desired position away from an armature receiving bore of the core. Generally speaking, force-back, including compaction, attained for the coils provides more effective and efficient use of magnetic core and conductor materials. Further, by achieving a high degree of compaction of the coil side portions, it is possible for some applications to use aluminum conductor wire for the coils in place of the more expensive copper wire without a corresponding decrease in the rating of the device even though the former does not have the conductivity of copper. In addition, the foregoing should be accomplished without unduly affecting the quality of the insulation normally covering the conductors by an economical yet efficient approach.

Accordingly, it is the primary object of the present invention to provide an improved method for attaining desired configurations of electrical conductors. It is a more particular object to provide an improved method for achieving the desired press-back of electrical coils with respect to coil accommodating structure.

It is yet another object of the present invention to provide an improved and efficient yet economical method for pressing back at least one electrical coil to the desired position relative to magnetic cores, especially cores for use in dynamoelectric machines, which attain at least some of the features mentioned above.

SUMMARY OF THE INVENTION

In carrying out the objects in one form, we provide an improved method of transforming or pressing back electrical conductor means from one configuration to another. In the exemplifications, the means comprises at least one electrical coil formed of a number of insulated conductor turns having portions received in slots of a coil accommodating structure, for instance, a magnetic core for use in an inductive device. The structures is initially disposed in proximity to a pressure transmitting medium, for example, an incompressible fluid, and the desired press-back achieved by imparting an electrical discharge pressure wave to the medium. The medium is directed into pressure engagement with preselected portions of the conductor means to force them into the desired configuration. The pressure wave imparted to the medium should be below the magnitude which will deleteriously affect the insulation covering the conductor means when such is used.

By choosing unhardened thermo-responsive adhesive insulating material in solution form for the pressure transmitting medium, it is possible to provide unusually effective penetration of the material into the interstices or spaces which might exist between turns entirely through the preselected portions and adhere to next adjacent turns. Thereafter, the material is hardened, as by the application of heat, the hardened material serving as an impregnant which binds the turns firmly together in the desired configuration and assists in dissipating the heat, generated when the conductor turns are energized during operation, from the interior regions of the turn mass.

The present invention thus provides effective pressback of electrical conductor means from one configuration to anoother in a rapid and efficient way without adeversely affecting the quality of any insulation which might cover the turns. Among other advantages, where the medium includes unhardenend bonding material, the selected portions may be impregnated with the material and firmly secured in the desired configuration. Other features and advantages will be brought out hereinafter.

The subject matter which we regard as our invention is particularly pointed out and distinctly claimed in the concluding portion of this specification. Our invention, itself, however, both as to its organization and method of operation, together with further objects and advantages thereof may best be understood by reference to the following description taken in connection with the accompanying drawings.

In the drawings:

BRIEF DESCRIPTION OF THE DRAWINGS

FIGURE 1 is a side elevational view, partially schematic and partially broken away, of slotted structure accommodating electrical coils, such as a stator, preparatory to the transformation of the coils by one form of the present invention and of electrical discharge apparatus having a fluid medium capable of transmitting electrical discharge pressure or shock waves to achieve the desired transformation;

FIGURE 2 is a view similar to FIGURE 1 illustrating the coils after transformation into the desired configuration by one form of the present invention;

FIGURE 3 is a view taken along line 3—3 in the direction of the arrows in FIGURE 2 to show details;

FIGURE 4 is a side elevational view, partially schematic and partially broken away, of a modified form of electrical discharge apparatus which may be employed in the transformation of electrical coils by a modified form of the method of the present invention;

FIGURE 5 is a view taken along line 5—5 in the direction of the arrows in FIGURE 4;

FIGURE 6 is an enlarged, fragmentary cross-sectional view of one of the slots and coil turns therein of the stator seen in FIGURE 4 prior to transformation of the electrical coils;

FIGURE 7 is a view generally similar to the view of FIGURE 4 illustrating the coils being transformed into the desired configuration;

FIGURE 8 is a view similar to that of FIGURE 6 except that the coil turns are shown transformed in accordance with the modified form of the present invention; and FIGURE 9 is a side elevational view, partially schematic and partially in cross-section, of apparatus capable of carrying out the method in still another modified form of the present invention.

DESCRIPTION OF THE PREFERRED EMBODIMENTS

Turning now to the drawings in more detail, and in particular to FIGURES 1–3 inclusive, the first embodiment of the present invention is shown in connection with the press-back or transformation into the desired configuration of electrical coils 11 carried in the slots 12 of a coil accommodating structure, e.g., a laminated ferromagnetic stator core 13 especially adapted for use in a fractional horsepower size, single phase, alternating current induction type dynamoelectric machine. In the exemplification, the core conventionally has thirty-six insulated slots 12 some of which accommodate coil side portions 14 of main winding coils to form four identical coil groups of three serially connected coils. The coils of each group are symmetrically disposed on the core, spanning four, six, and eight teeth respectively to define four main winding poles. Each coil has end turn portions 16 projecting axially beyond the end faces 17 of the core and is in turn wound of a predetermined number of insulated conductor turns in the usual way.

Prior to the desired press-back by the present invention, in the exemplification, the coils have been suitably disposed on the coil accommodating core in the manner illustrated in FIGURE 1 by any convenient means, as for example, by the winding machine disclosed in U.S. Patent No. 2,836,204 issued to Lowell M. Mason. At this stage of fabrication, the turns of the side portions of the individual coils are rather loosely distributed within the slots and the end turn portions are urged toward bore 18.

For purposes of disclosure, it will be assumed that in the embodiment illustrated by FIGURES 1–3 inclusive, it is desired to press back primarily end turn por- end faces 17 so that they will not interfere with either access to the bore or rotor rotation therein as well as provide space radially inward for receiving end turn portions of additional coils (e.g., auxiliary winding) to be subsequently installed on the core.

To accomplish the desired press-back, initially a pressure transmitting medium 21, preferably a generally incompressible fluid capable of transmitting pressure or shock waves, is placed in the vicinity of the core and the electrical coils to be transformed and a pressure wave imparted to it. As revealed in FIGURE 1, in the exemplification the stator core having coils is suitably disposed on a plurality of upstanding insulated studs 22 provided in an open-ended chamber 23 of pressure creating equipment in the form of electrical discharge apparatus. As illustrated, chamber 23 is formed by an open-ended, fluid impervious receptacle for repository constructed from steel or the like, which may be coated or otherwise lined along the chamber walls with non-corrosive material, such as "Teflon" (not shown), especially desirable if water or the like is employed as medium 21.

Prior to the installation of the core into chamber 23, a fluid-impervious medium container 27, such as a deflated bag, is mounted centrally of the chamber such that it is adapted to fit through the bore 18 of the core into ultimate engagement with the core and with the radially inner surfaces of the end turn portions 16 desired to be pressed back. In this exemplification, the container has the bottom end (as viewed in the drawing) secured by steel band 27 to a pressure wave-reflecting contoured deflector member 28, fabricated of rigid material, such as steel, which is connected to the bottom concavely curved wall of the wave generating region of chamber 23. The upper portion of container 26 has a tube 29 extending therethrough for admitting medium 21 into the container once core 13 has been properly arranged within chamber 23. To assist in controlling the flow of medium 21 into the container and for preventing reverse flow, a one-way valve (not shown) may be connected to the tube. Very small air vents may be provided in the upper portion of the container to permit the escape of air as the container is being filled with fluid. Plate 31, which is axially movable relative to tube 29, closes the open end of chamber 23 after the upper portion of the container has been securely fastened to tube 29, as by band 32.

With the components arranged in the relative positions shown in FIGURE 1, an electrical discharged pressure or shock wave, shown by the broken lines, is imparted to medium 21 which is then sharply driven into pressure engagement with coils 11, particularly in the regions of the end turn portions 16. To generate the pressure waves to medium 21 in the illustrated exemplification, the electrical discharge apparatus has a standard concentric electrode unit mounted upright such that spaced apart inner and outer electrically conductive electrodes 33, 34 project toward core 13, away from deflector member 28. The electrode unit is insulated from the chamber wall and deflector member 28 in any convenient manner, as by a molded rubber member 36.

To provide the electrical energy necessary to initiate and sustain an arc discharge across the electrodes capable of producing the pressure wave, the electrodes may be connected to any suitable electrical energy surge supply source 37 through conventional switch 38. By way of example, source 37 may include a bank of capacitors energized from an alternating current power source 39. One type of supply source which may be employed is disclosed more fully in the co-pending patent application of Richard D. Gibbs and Raymond G. Rushing Ser. No. 426,991, filed Jan. 21, 1965.

When it is desired to initiate operation, switch 41 is closed and the capacitors are charged to the desired energy level. Thereafter, switch 38 is closed so that the capacitors of source 37 can discharge a spark across electrodes 33, 34 thereby producing an arc discharge between the electrodes to create an electrical discharge pressure wave in medium 21.

The medium, as will be explained more fully hereinafter, is driven into pressure contact with the coils to effect press-back or transformation primarily in the regions of end turn portions 16 as seen in FIGURES 2 and 3, that is, compaction of these portions as well as a forcing back into a permanent set radially away from bore 18 and axially toward core end faces 17. In addition, some press back of the side turn portions will be attained by virtue of the end turn press-back and the medium entering the slots through slot entrance 42 to engage the side turn portions. Depending upon the composition of medium 21, the arc discharge may change the exact form of medium 21 from basically a liquid or solution having solid particles therein to partially a vapor or gas. The pressure wave imparted to the gas would impel the gas into pressure engagement with the turns to assist in the press back.

It should be noted at this time that in order for the desired press-back to be achieved, it is important that medium 21 be prevented from returning toward the axis of the core. This would have the effect of forcing the coil turns back toward their original positions. Prevention is accomplished in the first embodiment by maintaining medium container 26 adjacent the initial positions of the coil turns, away from the desired positions, and by forming container 26 of a material which will tear, shatter or otherwise rupture when the pressure wave of the desired magnitude is applied to medium 21. In actual practice, a bag formed of polyethylene material a few mils in thickness has proven adequate for this purpose. It is believed that the pressure wave thus emitted in the fluid tends to radiate radially and axially outward from the center of the bore in generally spherical form, causing medium 21 to increase rapidly until container 26 bursts apart (see FIGURE 2). The medium is then directed beyond the ruptured container, violently against the coil turns, to effect the desired press-back. The pressure wave is finally dissipated in chamber 23, outwardly of core 13, without being reflected back toward the initial positions of the coil turns. The medium is then collected in the bottom of chamber 23 for reuse.

For best results, the upper surface of deflector member 28 should have a contour which assists in focusing or reflecting the pressure wave in medium 21 toward the core bore and lower coil end turn regions to augment the action of medium 21. If desired, an appropriately shaped deflector member (not shown in the first embodiment) could also be employed at the upper portion of container 26 for wave propagating and focusing purposes.

In order to show more clearly how our invention, as described above, has been satisfactorily carried out in actual practice, the following examples are given. The method and apparatus revealed in FIGURES 1–3 inclusive, with water as medium 21, were utilized to press back four polar groups of coils 11. It was found that the degree of press-back was directly affected by the location of the electrodes relative to the center or axis of the core, the energy level used in producing the pressure wave, and the type of deflectors utilized. For example, optimum results occurred for a given energy input, when the electrodes were positioned coaxial with the axis of the core. In addition, generally speaking, better end turn compaction was obtained when deflector members were used. Energy levels supplied from source 37 in the range of 0.7–7.0 kilojoules (2.0–6.0 kilovolts) were sufficient to provide the desired magnitude of pressure wave to medium 21 without causing any significant lamination separation great enough to make the core unsatisfactory. When water is used as medium 21, any moisture which might remain after the coils have been pressed back should be removed. This may be accomplished by subjecting the core having coils to elevated temperatures, for instance, above 150° C. for approximately four hours to evaporate or otherwise vaporize any moisture which might be contained in the parts.

By employing unhardened electrical insulating and bonding material in a slurry or solution for medium 21 of the type which is capable of supporting an electrical arc, the medium may also serve to bond the turns firmly together in the desired positions after press-back has been achieved and augment the dissipation of heat from the coils during their subsequent energization. It may also produce a film of insulation on the slot walls to supplement ground insulation already in place on the core. Any suitable material may be used for this purpose, for instance a solution having a thermoresponsive high temperature dielectric material, such as a synthetic polyester resin of the type disclosed in U.S. Patent No. 2,936,296 issued on May 10, 1960 to F. M. Precopio and D. W. Fox for an aqueous dispersed acrylic interpolymer resin of the kind disclosed in Patent No. 2,787,603 granted to P. F. Sanders on Apr. 2, 1957. For best insulating, bonding and coil penetrating results, it is believed that the solution should have a Brookfield No. 1 viscosity at 4 r.p.m. generally less than 100 centipoises. Under these circumstances, sufficient unhardened material will adhere to the turns and core to provide excellent bonding action. Once press-back has been provided, material still adhering to the turns and core filling any voids in the mass of turns, may be hardened or cured as by the application of oven-controlled heat, e.g., baked for two hours at 200° C. The resulting hardened material which penetrates entirely through the interstices of the coils to impregnate them will securely hold the turns in place.

Turning now to FIGURES 4–8 inclusive, there is illustrated a second embodiment of the present invention in which like components to those already discussed in connection with the first embodiment are identified by like reference numerals. In this embodiment, chamber 23 itself is initially filled with medium 21 to retain the medium. The core 13 having the coils 11 is supported in communication with the medium by grooved metallic sleeve 49 attached at its lower edge (as viewed in the drawings) to flanged plate 51 which removably covers the open end of the chamber, except in the location directly over electrodes 33, 34. An upper sleeve 52 engages the peripheral edge of core 13 and surrounds the upper end turn portions 16 while removable plate 53 maintains the core and sleeve 52 firmly in position.

In the second embodiment, it will be assumed for purposes of disclosure that it is primarily desired to press-back the side turn portions 14 of the coils from the initial position shown in FIGURE 6 to that revealed in FIGURE 8 where the turns are compressed tightly in bundles away from slot entrances 42 in engagement with ground insulation 56 of the integral type revealed in the Baciu Patent 3,122,667 which covers the slot walls. It should be noted that in this embodiment, like the first embodiment, the core of the exemplification has four polar groups of three coils each. Thus, in order to derive the maximum press-back benefits for a given energy input, it is desirable to direct medium 21 primarily into the slots carrying the coils and to guide the medium away from the remaining slots.

This may be accomplished by providing an upper pressure wave and medium deflector assembly 54 (as viewed in the drawings) which may be raised and lowered relative to the core having coils by any suitable means such as conventional hydraulic cylinder unit (not shown). Assembly 54 is movable relative to plate 53 to permit independent removal of the plate and access to the core having coils as well as to deflector 55 of the assembly. When in the lower position, the peripheral surface 55 of the deflector assembly is convexly curved into a generally concave configuration. The free end of surface 55 terminates in a point 58 located in the vicinity of the core bore facing electrodes 33, 34. In addition, as best seen in FIGURE 5, deflector assembly 54 includes generally wedge shaped sections 59, triangular in cross-section, which have edges facing the axis of the core, side walls to direct fluid toward slot entrances 42 of slots carrying coil side portions, in and convexly curved rear walls adapted to extend in front of the entrances 42a of slots not accommodating coil side portions. As will be seen hereinafter, sections 59, along with surface 55, direct medium 21 into the slots holding turn portions to be pressed back while effectively shielding other parts of the core.

In operation, the pressure wave is electrically imparted to medium 21 similar to that in the first embodiment, the electrodes being immersed in the medium. As seen in FIGURE 7, by virtue of the electrical discharge pressure wave, medium is transmitted from chamber 23 toward assembly 54 and the core, through a guide channel 61 located directly over the electrodes and formed by a tubular cylinder attached to removable plate 51. The medium is then directed by the deflector assembly 54 into slot entrances 42 of slots carrying turns in the manner indicated by the arrows in FIGURES 5 and 7. Guide 61, which extends toward bore 18, not only provides communication between the core having coils and medium retaining chamber 23, but in addition, it also serves to prevent interference of the medium 21, which travels beyond the core denoted at 21a in FIGURE 7, with the coil side portions after they have been pressed back. In the exemplification, it also acts as a shield to inhibit bending back of the lower end turn portions.

In obtaining press-back of the coil side turn portions, the upwardly moving medium strikes the side surfaces of the triangular shaped sections 59 and the curved outer surface 55 of deflector assembly 54 such that the medium is directed through entrances 42a into pressure engagement with the turns of the side turn portions. Beveled edges 62 augment the fluid directing action of assembly 54. As seen in FIGURE 8, if sufficient pressure is employed on the turns, the force may be great enough to change the individual cross-section configurations of the turns from circular (FIGURE 6) to a non-circular shape (FIGURE 8) capable of producing a slot space factor higher than that attainable for turns of circular cross-section. However, the energy level chosen should not be high enough to adversely affect securement of the laminations to damage the insulation of the turns, or to distort or bend the laminations to the degree that the core is made unsuitable for use.

Any portion of medium 21 which might be driven within the confines of upper sleeve 52 is returned downwardly into the space between sleeve 49 and guide 61 through the core slots or other axial core openings, such as bolt holes or the like. After the desired press-back has been achieved, medium 21a may be returned to chamber 23 for reuse once assembly 54 has been raised and the components, including core 13, plates 51, 53 have been disassembled.

Consequently, like the first embodiment, the pressure wave and used medium 21a are prevented from being returned toward the axis of the core, and the desired press-back of the side turn portions, is readily affected without interference. Further, preselected coil portions may be pressed back while other portions may be shielded.

It will be obvious to those skilled in the art that the desired momentum or pressure wave may be imparted to medium 21 in the second embodiment by an arrangement other than the establishment of a discharge arc directly in the medium. For example, a fluid impervious and flexible diaphragm of rubber or the like could be securely fastened onto the under side of plate 51 as by cement extending entirely across chamber 23 and guide 61 when plate 51 is mounted in place over the chamber. Bolts may be used to hold the plate in position. A second type of pressure transmitting medium may then be arranged in guide 61 such that when a pressure wave is created in chamber 23, it will be transferred through the diaphragm and imparted to the medium located in the guide. This medium will then be directed into pressure engagement with the selected side turn portions in the manner previously discussed. This arrangement is beneficial in that the second medium need not be of the type capable of supporting a discharge arc through it.

Referring now to FIGURE 9 in which like components are illustrated by like reference numerals, the electrical discharge apparatus is essentially the same as that described in connection with FIGURES 4–8 inclusive. It differs principally in the components utilized to direct medium 21 into engagement with the coil side portions while shielding entrances 42a of slots not carrying side portions. In this embodiment, a reusable flexible container or sleeve 66 is disposed in the bore 18, between the core 13 and the deflector assembly 54 which does not incorporate triangular shaped sections 59 of the second embodiment. The upper and lower ends of the container are removably attached respectively to assembly 54 and guide 61 by removable straps 67, 68.

In operation, an electrical discharge pressure wave is imparted to medium 21 in chamber 23 as already outlined in connection with the second embodiment. The medium is rapidly transferred upwardly into contact with the deflector assembly which in turn directs the medium toward container 66. Elongated slits 69 in the walls of container 66 are aligned with entrances 42 of slots having coils and the medium passes through the slits into pressure engagement with the turns of the coil side portions to effect movement of them from the initial positions shown in FIGURE 6 to those seen in FIGURE 8. At the same time, the imperforate part of container 66 shields entrance 42a of the slots not carrying coil side portions and the end turn portions from medium 21. Like the previous embodiments, the apparatus in FIGURE 9 prevents the return of the pressure wave and medium 21 toward the axis of the core.

Consequently, in the illustrated embodiments of the invention described, the desired press-back or transformation is attained without injury to any insulation which might cover the individual turns, such as enamel, for those applications using insulation. The invention is not only versatile in nature and simple to practice but, also, the same general apparatus is capable of use with a number of coil accommodating structures of different configurations. In addition, the invention provides an economically effective solution to the problems associated with coil space utilization and coil transformation, permitting the substitution of the less expensive aluminum material for copper as coil material in some applications without a corresponding decrease in output rating for the device. It will be further understood that the principles of the present invention may be employed in inductive devices other than stators where it is desired to provide electrical coils with particular configurations.

It should be apparent to those skilled in the art that while we have shown and described what at present is considered to be the preferred embodiments of our invention in accordance with the patent statutes, it is to be understood that modifications can be made without actually departing from the true spirit and scope of this invention, and we therefore intend to cover in the following claims all such equivalent variations as fall within the invention.

What we claim as new and desire to secure by Letters Patent of the United States is:

1. A method of pressing back conductor turns of at least one electrical coil, having turn portions accommodated in slots of a magnetic core and turn portions extending beyond the slots, relative to the magnetic core, the method comprising the steps of: disposing the magnetic core having the at least one electrical coil, in proximity to a pressure transmitting medium; imparting electrical discharge pressure waves to the medium; and forcing turn portions of the conductor turns into the desired configuration and location relative to the magnetic core by the pressure waves imparted to the medium which pressure engage at least some of the conductor turns to effect the desired press-back.

2. The method of claim 1 in which selected parts of the magnetic core are shielded from pressure engagement by the pressure transmitting medium as the medium is forcing the turn portions into the desired configuration and location relative to the magnetic core.

3. A method of transforming electrical conductor means from one configuration to another, with at least part of the electrical conductor means being positioned in conductor accommodating structure, the method comprising the steps: disposing the structure accommodating the electrical conductor means in proximity to a pressure transmitting medium; imparting pressure waves to the medium; and forcing preselected portions of the electrical conductor means into the desired configuration and into a desired location relative to the conductive accommodating structure by directing the medium into pressure engagement with the preselected portions.

4. The method of claim 3 in which the preselected portions of the electrical conductor means are positioned in predetermined slots of the conductor accommodating structure and the preselected portions in the structure are forced into a compact mass next to walls of the slots by the pressure engagement of the medium therewith resulting from the pressure waves imparted to the medium.

5. The method of claim 3 in which the preselected portions of the electrical conductor means extend beyond the conductor accommodating structure and the preselected portions are forced radially and axially toward the structure by the pressure engagement of the medium therewith resulting from the pressure waves imparted to the medium.

6. The method of claim 4 in which the pressure transmitting medium is initially retained in communication primarily with entrances of the predetermined slots, and the pressure waves imparted to the medium causes the medium to be directed through the entrances and into pressure engagement with the preselected portions of the electrical conductor means to effect the desired transformation thereof.

7. The method of claim 3 in which the pressure transmitting medium includes unhardened bonding material which penetrates the preselected portions of the electrical conductor means as the portions are being transformed to the desired configuration, and subsequently hardening the bonding material retained by the preselected portions to secure the portions in the desired configuration.

References Cited

UNITED STATES PATENTS

| 3,036,374 | 5/1962 | Williams. | |
| 3,160,952 | 12/1964 | Corney et al. | |
| 3,333,327 | 8/1967 | Larsen | 29—596 |
| 3,333,328 | 8/1967 | Rushing | 29—596 |

JOHN F. CAMPBELL, *Primary Examiner.*

J. L. CLINE, *Assistant Examiner.*

U.S. Cl. X.R.

29—421; 72—56